United States Patent
Ball et al.

(10) Patent No.: US 7,333,775 B2
(45) Date of Patent: Feb. 19, 2008

(54) METHOD FOR DETECTION OF RADIO COMMUNICATION TERMINALS

(75) Inventors: Carsten Ball, Munich (DE); Michael Färber, Wolfratshausen (DE)

(73) Assignee: Siemens Aktiengesellschaft, Munich (DE)

(*) Notice: Subject to any disclaimer, the term of this patent is extended or adjusted under 35 U.S.C. 154(b) by 820 days.

(21) Appl. No.: 10/834,358

(22) Filed: Apr. 29, 2004

(65) Prior Publication Data

US 2004/0229571 A1   Nov. 18, 2004

(30) Foreign Application Priority Data

Apr. 29, 2003  (DE) ............................... 103 19 321

(51) Int. Cl.
*H04B 17/00* (2006.01)

(52) U.S. Cl. ................ 455/67.14; 455/67.11; 455/68; 455/69; 455/522; 455/561; 455/226.1; 455/226.2; 455/226.3; 455/296

(58) Field of Classification Search ........ 455/418–420, 455/423–425, 436–446, 450–451, 452.1–452.2, 455/522, 296, 63.1–63.3, 67.11–67.16, 68–70, 455/561, 114.1–114.3, 115.1–115.3, 226.1–226.3; 370/241, 241.1, 242, 318, 328–333, 464–465; 375/346

See application file for complete search history.

(56) References Cited

U.S. PATENT DOCUMENTS

| | | | |
|---|---|---|---|
| 6,842,438 B1 * | 1/2005 | Benedict et al. ............. | 370/328 |
| 6,999,725 B2 * | 2/2006 | Nitta et al. ................. | 455/63.1 |
| 7,043,242 B2 * | 5/2006 | Kuiri et al. ................. | 455/436 |
| 7,130,635 B2 * | 10/2006 | Cerwall et al. ............. | 455/450 |
| 2001/0019961 A1 * | 9/2001 | Nakahara et al. ........... | 455/522 |
| 2002/0098860 A1 * | 7/2002 | Pecen et al. ................ | 455/522 |

* cited by examiner

*Primary Examiner*—Tuan Tran
(74) *Attorney, Agent, or Firm*—Staas & Halsey LLP

(57) ABSTRACT

A method detects which radio communication terminals use interference suppression procedures, in a radio communication system. Here radio communication terminals periodically return measurement signals which represent radio field characteristics and/or reception situations determined at the radio terminal to a base station and compare these signals with one another and also with threshold values determined on the base station side. The comparisons conducted are used for assigning radio communication terminals to groups, with a first group being assigned those radio communication terminals which display a good reception situation during the threshold value comparison, whereas a second group is assigned all further radio communication terminals.

19 Claims, 2 Drawing Sheets

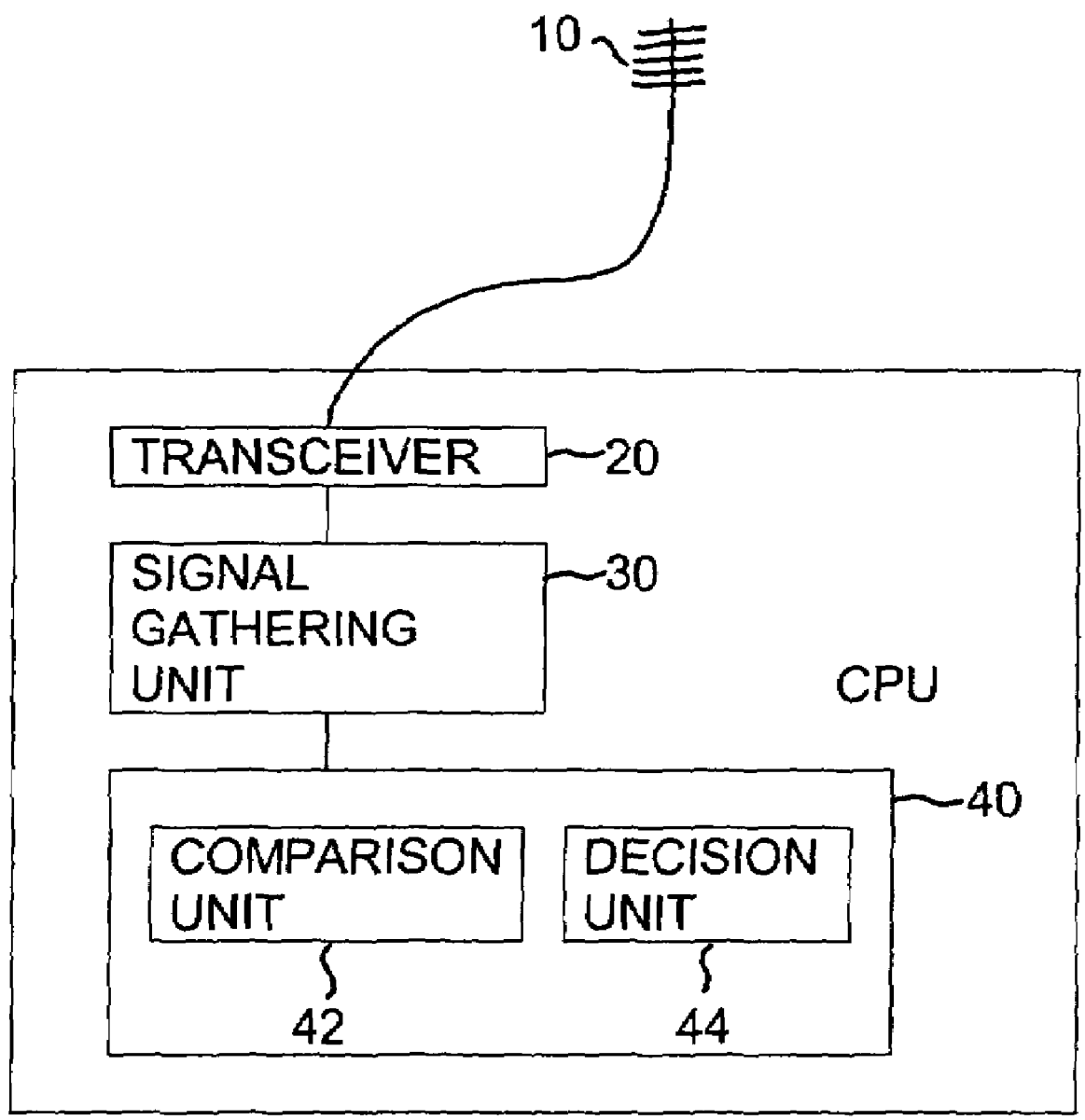

METHOD FOR DETECTION OF RADIO COMMUNICATION TERMINALS

CROSS REFERENCE TO RELATED APPLICATIONS

This application is based on and hereby claims priority to German Application No. 10319321.9 filed on Apr. 29, 2003, the contents of which are hereby incorporated by reference.

BACKGROUND OF THE INVENTION

The invention relates to a method for detection of radio communication terminals which are embodied for use of interference suppression procedures, assigned to a radio communication system.

There are known interference suppression procedures which can be executed on the subscriber side at a radio communication terminal. These types of methods have been presented for example at the 3GPP TSG GERAN #12, 18.-22. Nov. 2002, Sophia Antipolis, France, in the documents "SINGLE Antenna Interference Cancellation (SAIC)-proposed scenarios for evaluation and requirement specification", Ericsson, Nokia, Tdoc GP-022962, Agenda item 7.1.5.9 or in "SAIC: discussion on standardisation and signalling", Motorola Inc., Tdoc GP023100, Agenda Item 7.1.5.9, or in "Simulation Assumptions for GSM SAIC", Motorola, GP-023101, Agenda Item 7.1.5.9, or in "SINGLE; Antenna Interference Cancellation (SAIC): Whitening Process for adjacent interferers", Nortel Networks, GP023102, Agenda Item 7.1.5.9, or in "On the Potential Performance Gains of SINGLE;-Antenna Interference Cancellation and Ways to Assess it", Intel Corp., TSGG#12(02)3207, Agenda Item 7.1.5.9 or in "Draft Feasibility Study on SINGLE Antenna Interference Cancellation (SAIC) for GSM Networks", Cingular Wireless, GP-022892, Agenda Items 6.3, 7159.

Some of the above-mentioned interference suppression procedures can also be used at radio communication terminals, but their use is neither prescribed nor standardized. Thus radio communication terminals are available both with and also without options for interference suppression in a radio cell.

SUMMARY OF THE INVENTION

One possible object for the present invention is to specify a method with which radio communication terminals which are embodied for use of an interference suppression procedure are easily detectable within a radio communication system.

The inventors propose a method which allows network operators to detect radio communication terminals provided with the option of interference suppression and to use them especially advantageously for optimized network planning or for efficient radio resource management. These radio communication terminals are for example preferably assigned to those radio communication resources which cannot use radio communication terminals without interference suppression capabilities.

Especially advantageous is the implementation of a modified, network-side-controlled transmit power control and a modified handover algorithm.

In summary the method helps to optimize radio transmission resources, increase subscriber density and improve network quality.

The method can be implemented without requiring changes to a radio communications standard and can also be implemented in existing radio communication systems with minimal effort.

No exchange of additional signaling is needed for the method, avoiding the need to tie in additional radio transmission resources unnecessarily on the one hand and of generating additional interference on the other hand.

Specific threshold values are defined on the base station side and these are compared to measurement signals which are returned to the base station from a radio communication terminal to analyze its receive situation and to evaluate the radio field characteristics at the base station.

Measurement signals are used for this purpose for example which serve to evaluate a receive level RXLEV and a receive quality RXQUAL, with, in a preferred embodiment, additional measurement signals being used which serve to analyze the bit error rate BER and/or a bit error probability BEP and/or a carrier-to-interference ratio C/I.

For example the measurement signals mentioned above are determined in any event in a GSM mobile radio network for a handover to be performed or for what is known as "link adaption" or for transmit power matching on the base station side and are thus available at all times for the method without requiring any additional effort.

The threshold comparison conducted assigns radio communication terminals to at least two groups.

Those radio communication terminals which show good reception during the threshold value comparison are assigned to a first group. Since radio communication terminals with interference suppression procedures generally demonstrate good reception capabilities, these are preferably assigned to the first group. A further optional subdivision of the first group can be undertaken depending on reception or depending on a qualitative analysis made of the interference suppression procedures.

Especially advantageously during assignment to the groups is taking into account on the network-side both a system load and also a frequency reuse factor of assigned transceivers of the base station.

Radio communication terminals which do not have any options for interference suppression procedures, are generally assigned to a second group since these demonstrate worse reception compared to the first group on threshold value comparison.

The assignment to the groups is undertaken especially advantageously using an additional network-side-controlled transmit power reduction. This transmit power reduction will be greater for a radio communication terminal which has capabilities for interference suppression than for a radio communication terminal which has no capabilities for interference suppression.

The interference suppression capabilities of a radio communication terminal can also be determined on the network side, with a balanced uplink/downlink connection, by decoding speech or data frames received on the network side once with interference suppression and once without interference suppression. Comparing measured subscriber data with measured base station data from the two decoding operations allows a classification which takes account of a known behavior of a base station receiver.

The periodically conducted comparison of threshold values and a comparison of the measurement signals of different radio communication terminals achieves a clear separation of the first and the second group averaged over time.

With a radio cell of the radio communication system occupying a smaller geographical area measurement signals such as receive level RXLEV and receive quality RXQUAL of the different radio communication terminals differ only slightly from one another. Based on this knowledge an algorithm is introduced on the base station side, with the aid of which an RXLEV to RXQUAL ratio is calculated.

In an advantageous further development, in addition to the RXLEV to RXQUAL ratio, further ratios and dependencies are taken into account. For the same carrier-interference ratio (C/I) a dependency between the bit error rate BER determined at the radio communication terminal and its receive level RXLEV exists. With the aid of interference suppression procedures at the radio communication terminal, interference is reduced for a constant carrier. With the aid of a network-side-controlled transmit power regulation the carrier is adjusted in such as way as to adhere to a target value for the carrier-to-interference ratio or a target value for the bit error rate BER. A simultaneous calculation of a ratio of the bit error rate BER for transmit power reduction or of the receive quality RXQUAL for transmit power reduction is preferably performed at the same time as the calculation of the RXLEV to RXQUAL ratio.

Based on these dependencies the radio communication terminals are assigned to the relevant group.

With the aid of Radio Resource Management (RRM) allocation of radio transmission resources is optimized to take account of the groups, where radio communication terminals which have no interference suppression capabilities are correspondingly assigned to stable radio transmission resources or radio transmission channels.

In an advantageous further development, a position of a radio communication terminal observed is taken into consideration for group assignment in addition to the circumstances mentioned above. This is especially advantageous for wide-coverage radio cell since the position specification allows the radio cell to be segmented into smaller areas, for which in turn the slight deviations of the receive level RXLEV and receive quality RXQUAL already described above apply.

The position specification can be determined especially advantageously and with no extra effort by the what is known as a Cell-ID Timing-Advance-LCS mechanism, which is employed for the GSM mobile radio system for example. For position determination, as well as large number of other methods, the so-called E-OTD method or the time difference of arrival (TDOA)-LCS method are known.

In an advantageous embodiment the positions determined and the relevant group are stored in a network-side planning database in which subscriber-specific measurements are already stored for currently installed radio communication systems.

In a further advantageous embodiment of the method corrupted or disturbed signals are transmitted alternately during an existing connection to the radio communication terminal. If the radio communication terminal continues to exhibit good reception it is concluded that the terminal features an interference suppression procedure and it is assigned to the first group.

Instead of the disturbed signal a payload signal greatly reduced in power in specific frames can be sent in order to test the interference suppression capabilities of the radio communication terminal.

With a GSM mobile radio system the SACCH signal is disturbed in specific blocks for example, which is used to determine the receive quality RXQUAL. Since the receive quality RXQUAL is returned to the base station, as a result of the disturbance which occurs block-by-block, a periodic pattern in the ratio of receive quality RXQUAL to bit error rate BER is only detected for an observed radio communication terminal when the radio communication terminal has no interference suppression capabilities.

In a further advantageous embodiment of the method corrupted or disturbed signals are transmitted alternatley during an existing connection to the radio communication terminal. A radio communication terminal registers for example with the GSM mobile radio system by an SDCCH signal, with the aid of which information about "Ciphering", "Dialed Number information" or "Channel Allocation" is exchanged.

In a first step an SDCCH signal with interference is sent on the base station side. This interference is introduced on the base station side in such a way as to simulate the effect of significant interference on the connection to be established. If the radio communication terminal is capable, despite this, of decoding the SDCCH signal, registration is continued. This type of radio communication terminal is then assigned to the first group. If the radio communication terminal aborts the registration, the undisturbed SDCCH signal is sent again by the base station in a second step.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 is a schematic view of a base station.

DETAILED DESCRIPTION OF THE PREFERRED EMBODIMENT

Figure 1:
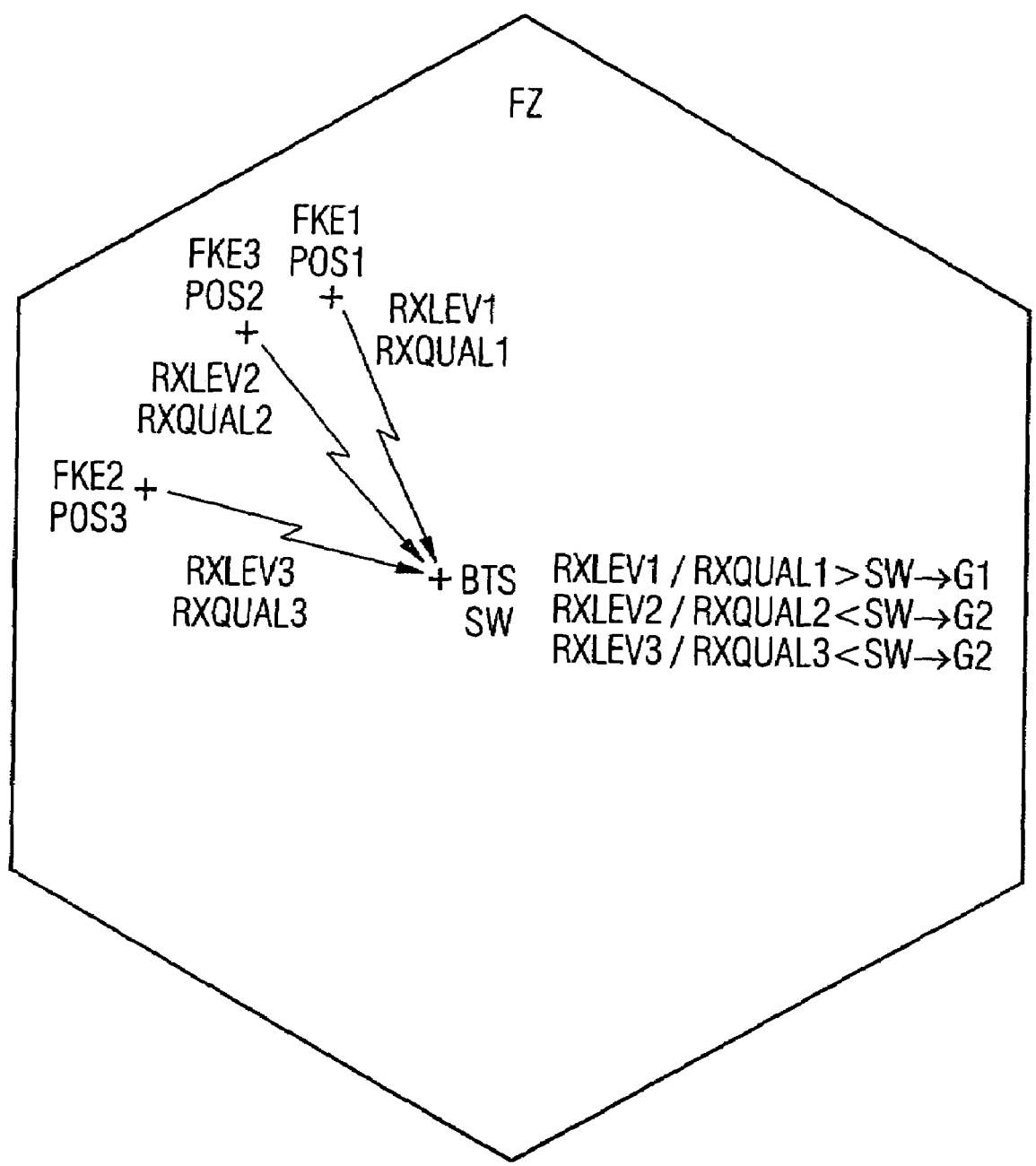
FIG. 1 is a schematic drawing of a radio cell of a radio communication system for using the method in accordance with the invention.

Reference will now be made in detail to the preferred embodiments of the present invention, examples of which are illustrated in the accompanying drawings, wherein like reference numerals refer to like elements throughout.

In the radio cell FZ shown in FIG. 1 there are three radio communication terminals FKE1 to FKE3 and one base station BTS. It is assumed below that only a first radio communication terminal FKE1 is embodied for use of an interference suppression procedure.

At each radio communication terminal FKE1 to FKE3 the relevant receive levels RXLEV1 to RXLEV3 and receive qualities RXQUAL1 to RXQUAL3 are determined and transferred to the base station BS.

There, for each of the radio communication terminals FKE1 to FKE3 ratios RXLEV1/RXQUAL1 or RXLEV2/RXQUAL2 or RXLEV3/RXQUAL3 are determined and compared with a threshold value SW. The threshold value comparison is used to assign the first radio communication terminal FKE1 to a first group G1 and to assign radio communication terminals FKE2 and FKE3 to a second group G2.

If necessary this comparison also takes account of items POS1 to POS3 of the radio communication terminals FKE1 to FKE3 for allocation to the groups.

FIG. 2 shows a base station to detect which radio communication terminals use an interference suppression procedure in a radio communication system. The base station has an antenna 10, a transciever 20, a signal gathering unit 30, and a central processor unit (CPU) 40. The CPU 40 has a comparison unit 42 and a decision unit 44. The signal gathering unit 30 obtains measurement signals indicating radio reception characteristics for the radio communication terminals of the radio communication system. The comparison unit 42 compares the measurement signals with a threshold value to obtain comparison results. The decision unit 44 concludes that a radio communication terminal uses the interference suppresion procedure if the comparison results show good reception characteristics for the radio communication terminal relative to the threshold. The comparison unit 42 concludes that a radio communication terminal does not use the interference suppression procedure if the comparison results show poor reception characteristics for the radio communication terminal relative to the threshold.

The invention has been described in detail with particular reference to preferred embodiments thereof and examples, but it will be understood that variations and modifications can be effected within the spirit and scope of the invention.

The invention claimed is:

1. A method for detecting which radio communication terminals in a radio communication system use interference suppression procedures, comprising:
    obtaining measurement signals at the radio communication terminals, the measurement signals being obtained from radio field and/or receive characteristics;
    periodically returning the measurement signals from the radio communication terminals to a base station;
    comparing the measurement signals with a threshold value defined for the base station side, to produce comparison results; and
    assigning radio communication terminals to groups based on the comparison results such that radio communication terminals which show good reception characteristics during the threshold value comparison are assigned to a first group and all other radio communication terminals are assigned to a second group, the first group being the group using the interference supression procedures.

2. The method in accordance with claim 1, wherein the measurement signals comprise measurement signals used to evaluate a receive level and a receive quality at the radio communication terminal.

3. The method in accordance with claim 2, wherein the measurement signals further comprise measurement signals to evaluate a bit error rate and/or a bit error probability and/or a carrier frequency to interference ratio.

4. The method in accordance with claim 3, further comprising reducing a network-side-controlled transmit power for the radio communication terminal if the comparison results show good reception characteristics.

5. The method in accordance with claim 4, further comprising:
    determining positions of the radio communication terminals; and
    considering the positions when assiging radio communication terminals to groups.

6. The method in accordance with claim 5, wherein the position and the group to which each radio communication terminal is assigned is stored in a network-side planning database.

7. The method in accordance with claim 6, wherein during an existing connection, the base station alternately sends out to a radio communication terminal corrupted signals and non-corrupted signals and/or varied transmit power signals and normal transmit power signals, and
    the terminal is assigned to a group on the basis of the measurement signals returned and a reaction of the terminal.

8. The method in accordance with claim 6, wherein during a connection setup, the base station alternately sends out corrupted signals and non-corrputed signals to the radio communication terminal, and
    the terminal is assigned to a group on the basis of the measurement signals returned and a reaction of the terminal.

9. The method in accordance with claim 6, wherein on the basis of the group assignment:
    base station transmit power is regulated and
    a handover strategy and handover threshold values are determined and
    a group-individual notification of radio transmission resources is undertaken, and
    encoding procedures and/or link adaption threshold values are determined.

10. The method in accordance with claim 9, wherein the radio communication system is a GSM mobile radio system or a GSM/EDGE mobile radio system or a GSM/GPRS/EDGE mobile radio system.

11. The method in accordance with claim 1, further comprising reducing a network-side-controlled transmit power for the radio communication terminal if the comparison results show good reception characteristics.

12. The method in accordance with claim 1, further comprising:
    determining positions of the radio communication terminals; and
    considering the positions when assiging radio communication terminals to groups.

13. The method in accordance with claim 12, wherein the position and the group to which each radio communication terminal is assigned is stored in a network-side planning database.

14. The method in accordance with claim 1, wherein
    during an existing connection, the base station alternately sends out to a radio communication terminal corrupted signals and non-corrupted signals and/or varied transmit power signals and normal transmit power signals, and
    the terminal is assigned to a group on the basis of the measurement signals returned and a reaction of the terminal.

15. The method in accordance with claim 1, wherein during a connection setup, the base station alternately sends out corrupted signals and non-corrputed signals to the radio communication terminal, and
    the terminal is assigned to a group on the basis of the measurement signals returned and a reaction of the terminal.

16. The method in accordance with claim 1, wherein on the basis of the group assignment:
    base station transmit power is regulated and/or
    a handover strategy and handover threshold values are determined and/or
    a group-individual notification of radio transmission resources is undertaken, and/or
    encoding procedures and/or link adaption threshold values are determined.

17. The method in accordance with claim 1, wherein the radio communication system is a GSM mobile radio system or a GSM/EDGE mobile radio system or a GSM/GPRS/EDGE mobile radio system.

18. A method for detecting which radio communication terminals use an interference suppression procedure in a radio communication system, comprising:
- obtaining measurement signals at a base station, which measurement signals indicate radio reception characteristics for the radio communication terminals of the radio communication system;
- comparing the measurement signals with a threshold value to obtain comparison results;
- if the comparison results show good reception characteristics for a radio communication terminal relative to the threshold, then concluding that the radio communication terminal uses the interference suppression procedure; and
- if the comparison results show poor reception characteristics for a radio communication terminal relative to the threshold, then concluding that the radio communication terminal does not use the interference suppression procedure.

19. A base station to detect which radio communication terminals use an interference suppression procedure in a radio communication system, comprising:
- a signal gathering unit to obtain measurement signals indicating radio reception characteristics for the radio communication terminals of the radio communication system;
- a comparison unit to compare the measurement signals with a threshold value to obtain comparison results; and
- a decision unit to:
    - conclude that a radio communication terminal uses the interference suppression procedure if the comparison results show good reception characteristics for the radio communication terminal relative to the threshold, and
- conclude that a radio communication terminal does not use the interference suppression procedure if the comparison results show poor reception characteristics for the radio communication terminal relative to the threshold.

* * * * *